May 1, 1956        T. F. JONES        2,743,985
REMOTE MEASURING DEVICE
Filed Sept. 25, 1950
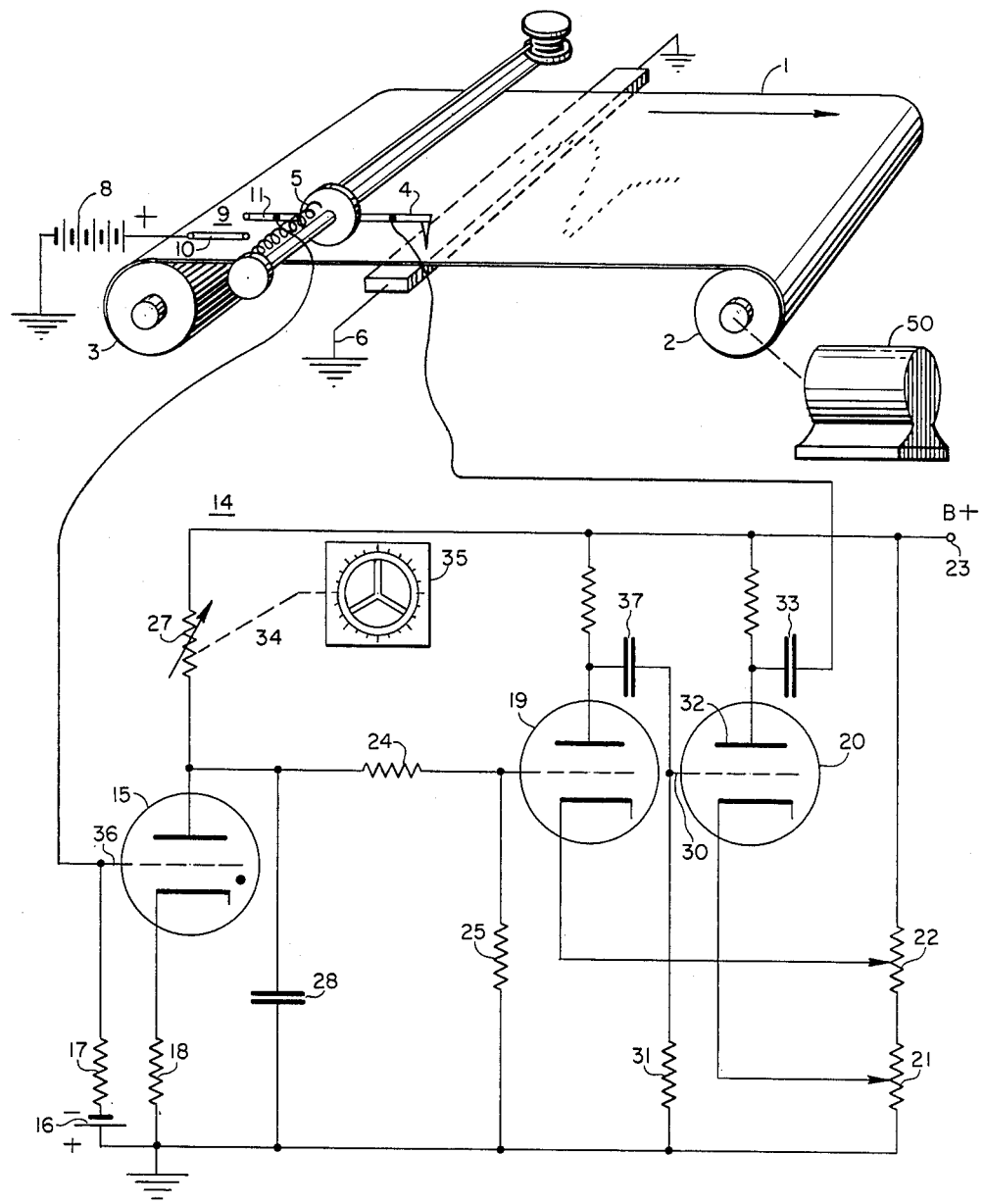
INVENTOR
THOMAS F. JONES
BY
ATTORNEYS

United States Patent Office 2,743,985
Patented May 1, 1956

2,743,985

REMOTE MEASURING DEVICE

Thomas F. Jones, Roxbury, Mass.

Application September 25, 1950, Serial No. 186,625

4 Claims. (Cl. 346—33)

(Granted under Title 35, U. S. Code (1952), sec. 266)

This invention relates to a remote metering system for measuring and indicating the value of a remote angle, shaft bearing or other independent variable.

More particularly it relates to a remote metering system of the type wherein the remote variable to be measured is mechanically coupled to a portion of an electric circuit, and serves to control the output of the circuit, while a suitable recording instrument is also connected to the circuit, for translating the control of the circuit output into a visual record of the variable being measured.

One means already known in the art for obtaining measurements of such remote independent variables provides for the control by the variable being measured of a potential developed across a resistor at the remote station. This potential is matched by another potential developed at the local recording station. The local potential may be varied progressively, and the condition of matching caused to fire a thyratron or other switching device to produce an indication on a synchronized recorder.

My invention avoids the necessity of controlling a potential at the remote station, and the difficulties attendant thereto in obtaining consistent and accurate measurements of a remote independent variable.

An object of my invention therefore is to provide improved apparatus for producing an instantaneous visual indication of a measurement made at a remote station.

Another object of my invention is to provide means for indicating and preserving a continuous record of the value of a remote independent variable.

Another object is to provide a continuous indication in a recording apparatus of the instantaneous magnitude or value of a remote independent variable.

Other objects and advantages may be better understood by referring to the following description, taken in connection with the accompanying drawing, in which the single figure is a schematic diagram of one form of the invention.

Briefly, my invention consists of providing, in association with a recording device of the time base type, an electronic circuit which serves to convert the magnitude or value of the independent variable to be measured into a proportional time phasing of an output voltage pulse relative to the beginning of the time base.

One form of time base recording device which may be used in practicing my invention is the well known cathode ray oscilloscope. Another form is a time base recording apparatus of the electrolytic type. As shown in the drawing, such a recording apparatus usually includes an electric current sensitive recording paper 1 mounted for movement between a pair of rollers 2 and 3 driven by a suitable motor 50. The recording paper is impregnated with a chemical which will react when an electric current is passed through the paper to produce a visible mark. An electrically conducting stylus 4 is provided which in operation produces the time base by traveling transversely across the recording paper at a low constant speed. Upon completion of its excursion across the paper, the stylus 4 is quickly returned to its starting point by a spring 5 or other means not shown, and recommences its cycle. During the course of its low speed excursion across the paper, the stylus 4 may receive a pulse of electric energy, which will be conducted through the stylus 4 and the chemically impregnated paper 1 to a ground return 6. This marks the paper at a position which will provide a permanent indication of the relative time phasing of the received pulse and the starting time of the stylus excursion.

The above described operation is conventional in recording apparatus, and as such forms no part of the present invention. It is therefore considered unnecessary to describe such operation in greater detail.

One form of an electronic circuit which may be associated with the recording apparatus to practice my invention is indicated generally at 14. This circuit may be described as follows. Gas tube 15 is biased to remain normally cut off by negative voltage source 16 and resistors 17 and 18. Tubes 19 and 20 are appropriately cathode biased, by means of potentiometers 21 and 22 connected in series to plate supply voltage 23, to operate as an overbiased amplifier. Tube 19 receives its grid bias from voltage dividing resistors 24 and 25, connected in series with rheostat 27 to the plate supply 23. Also connected in the grid circuit of tube 19, and in series with rheostat 27, is capacitor 28. Grid 30 of tube 20 is returned to ground through resistor 31. The values of grid resistances of tubes 19 and 20 are chosen with relation to bias potentiometers 21 and 22 so that tube 19 is normally off and tube 20 is normally conducting. Plate 32 of tube 20 is connected through coupling capacitor 33 to the recorder stylus.

Rheostat 27 is physically located at the site of the remote independent variable whose value or magnitude is to be measured. This rheostat is mechanically coupled, as at 34, to the means 35 which comprises the independent variable, for example a rotatable antenna shaft.

A direct current voltage source 8 is connected to one contact 10 of switch 9. The other contact 11 of switch 9 is mounted on, but insulated from, stylus 4, and is connected to grid 36 of gas tube 15.

The operation of the device is as follows. When the recording apparatus is not energized, and the stylus is not making its periodic excursions, capacitor 28 is charged by current from plate supply 23 through rheostat 27 to a voltage level dependent on the setting of the rheostat. Gas tube 15 will not conduct, however, because of bias voltage 16.

When the recorder is in operation, however, stylus 4 momentarily closes contacts 10 and 11 of switch 9 at the beginning of its excursion. This permits a pulse of positive voltage from source 8 to reach the grid 36 of tube 15, and fire the tube independently of the charge on capacitor 28. The capacitor 28 is thus completely discharged, and commences its charging cycle, coincident in time with the start of the stylus excursion.

As the stylus continues its excursion across the recording paper, capacitor 28 continues to charge, at a time rate controlled by the setting of rheostat 27, which is in turn proportional to the value of the independent variable being measured (in this case shaft position). Grid voltage of tube 19 rises with the increase of voltage across capacitor 28, to the fixed value, determined by its cathode bias, at which tube 19 conducts. When tube 19 conducts, the drop in its plate voltage is coupled through capacitor 37 to grid 30, cutting off tube 20, and causing its plate voltage to rise abruptly. This rise in plate voltage is coupled through capacitor 33 as a positive pulse to the stylus 4, and marks the chemically impregnated recording paper 1 at a point along the stylus excursion which is a distance from the starting point directly and linearly proportional to the time required for capacitor 28 to charge to the firing potential of tube 19.

Upon completion of the stylus excursion, the stylus 4 is returned to its starting point, and a new excursion begins. This again closes switch 9 momentarily, tube 15 is again fired, and capacitor 28, which has maintained its charge during the whole stylus excursion time, is discharged. Thus gas tube 15 and capacitor 28, taken together, operate as a sawtooth generator. The output voltage waveform from this sawtooth generator has a slope determined or controlled by the setting of rheostat 27. The discharge of capacitor 28 drops the grid potential of tube 19 to a point at which the tube returns to its normally off condition. The resulting rise in plate voltage of tube 19 is coupled through capacitor 37 to the grid of tube 20, and returns this tube to its normally conducting condition.

Thus it may be seen that the linear distance of the recording paper mark from the starting point of the stylus excursion is inversely proportional to the rate of charging of capacitor 28, or directly proportional to the size of series rheostat 27, and therefore directly proportional to the value or magnitude of the independent variable being measured.

The voltage level to which capacitor 28 must charge in order to fire tube 19 is a sufficiently small fraction of the plate supply voltage that its time rate of charging will be essentially constant, within the limits of accuracy required in the measuring system.

Although only one embodiment of the present invention has been disclosed and described herein, it is expressly understood that various changes and substitutions may be made therein without departing from the spirit of the invention as well understood by those skilled in the art. For instance, capacitor 28 could be made the variable element instead of rheostat 27, and its value could be under the control of the variable 35. Likewise the pulse generator formed by tubes 19 and 20 can assume many different forms other than that illustrated.

The invention described herein may be manufactured and used by or for the Government of the United States of America for governmental purposes without the payment of any royalties thereon or therefor.

What is claimed is:

1. A device for indicating and recording the magnitude of a remote independent variable comprising: a recorder including a recording medium; a recording element for marking the recording medium responsive to a voltage pulse, and means for causing an excursion of said recording element across the recording medium; a saw-tooth voltage generator including resistance and capacitance elements one of which is variable to vary the slope of the waveform of the generated saw-tooth voltage; means for varying the variable element of said saw-tooth generator in accordance with the magnitude of said remote variable; biased amplifier means coupled to the output of said saw-tooth voltage generator operative to generate an output pulse responsive to the attainment of a predetermined voltage level by said saw-tooth voltage; means synchronizing said recording element excursion and said saw-tooth generator; and means connecting the output of said pulse generator to said recording element for marking said recording medium.

2. A device for indicating and recording the magnitude of a remote independent variable comprising: a recorder including a recording medium, a recording element for marking the recording medium responsive to a voltage pulse, and means for causing an excursion of said recording element across the recording medium; a saw-tooth voltage generator including resistance and capacitance elements, the resistance element being variable to vary the slope of the waveform of the generated saw-tooth voltage; means for varying said variable resistance element in accordance with the magnitude of said remote variable; biased amplifier means coupled to the output of said saw-tooth voltage generator operative to generate an output pulse responsive to the attainment of a predetermined voltage level by said saw-tooth voltage; means synchronizing said recording element excursion and said saw-tooth generator; and means connecting the output of said pulse generator to said recording element for marking said recording medium.

3. A device for indicating and recording the magnitude of a remote independent variable comprising: a recorder including a recording medium, a recording element for marking the recording meduim responsive to a voltage pulse, and means for causing an excursion of said recording element across the recording medium; a source of direct voltage; saw-tooth voltage generating means including resistance and capacitance elements connected across said source of direct voltage adapted to derive a saw-tooth voltage across said capacitance element, one of said elements being variable to vary the slope of the waveform of said saw-tooth voltage; biased amplifier means coupled to the output of said saw-tooth voltage generator operative to generate an output pulse responsive to the attainment of a predetermined voltage level by said saw-tooth voltage, the operating voltages for said biased amplifier including the bias voltages therefor being derived from said source of direct voltage; means synchronizing said recording element excursion and said saw-tooth generator; means connecting the output of said pulse generator to said recording element for marking said recording medium; and means for varying the variable element in accordance with the magnitude of said remote variable.

4. A device for recording and indicating the magnitude of a remote independent variable comprising: a recorder including a recording medium, a recording element for marking the recording medium responsive to a voltage pulse, and means for causing an excursion of said recording element across the recording medium; a source of direct voltage; saw-tooth voltage generating means including resistance and capacitance elements connected across said source of direct voltage adapted to derive a saw-tooth voltage across said capacitance element, said resistance element being variable to vary the slope of the waveform of said saw-tooth voltage; biased amplifier means coupled to the output of said saw-tooth voltage generator operative to generate an output pulse responsive to the attainment of a predetermined voltage level by said saw-tooth voltage, the operating voltages for said biased amplifier including the bias voltages therefor being derived from said source of direct voltage; means synchronizing said recording element excursion and said saw-tooth generator; means connecting the output of said pulse generator to said recording element for marking said recording medium; and means for varying said variable resistance element in accordance with the magnitude of said remote variable.

References Cited in the file of this patent

UNITED STATES PATENTS

| | | |
|---|---|---|
| 2,108,089 | Turner | Feb. 15, 1938 |
| 2,277,000 | Bingley | Mar. 17, 1942 |
| 2,539,553 | Rich | Jan. 30, 1951 |
| 2,560,256 | Shrader | July 10, 1951 |
| 2,587,319 | Hogan | Feb. 26, 1952 |
| 2,596,118 | Bischoff et al. | May 13, 1952 |